United States Patent
Thakkar et al.

(10) Patent No.: US 11,740,821 B2
(45) Date of Patent: Aug. 29, 2023

(54) COST-AWARE GARBAGE COLLECTION FOR CLOUD STORAGE

(71) Applicant: EMC IP Holding Company LLC, Hopkinton, MA (US)

(72) Inventors: Smriti Thakkar, San Jose, CA (US); Ramprasad Chinthekindi, San Jose, CA (US); Abhinav Duggal, Jersey City, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/227,866

(22) Filed: Apr. 12, 2021

(65) Prior Publication Data

US 2022/0326867 A1 Oct. 13, 2022

(51) Int. Cl.
*G06F 3/06* (2006.01)
*G06F 12/02* (2006.01)

(52) U.S. Cl.
CPC ........... *G06F 3/0641* (2013.01); *G06F 3/067* (2013.01); *G06F 3/0613* (2013.01); *G06F 3/0614* (2013.01); *G06F 3/0652* (2013.01); *G06F 12/0253* (2013.01)

(58) Field of Classification Search
None
See application file for complete search history.

(56) References Cited

U.S. PATENT DOCUMENTS

| | | | | |
|---|---|---|---|---|
| 7,610,437 B2* | 10/2009 | Sinclair | ................. | G06F 3/0652 711/104 |
| 7,984,084 B2* | 7/2011 | Sinclair | ............... | G06F 16/1847 707/818 |
| 8,285,918 B2* | 10/2012 | Maheshwari | ....... | G06F 12/0891 711/159 |
| 8,443,263 B2* | 5/2013 | Selinger | .............. | G06F 11/1068 714/768 |
| 8,732,403 B1* | 5/2014 | Nayak | ................... | G06F 3/0619 711/170 |
| 8,873,284 B2* | 10/2014 | Sinclair | ............... | G06F 12/0246 365/185.11 |
| 9,223,693 B2* | 12/2015 | Sinclair | ............... | G06F 12/0246 |

(Continued)

OTHER PUBLICATIONS

Lisa Eadicicco, "Which Cloud Storage Is Cheapest? How Prices For Google Drive, Dropbox, iCloud, and OneDrive Compare", Dec. 14, 2014, pp. 1-9, https://www.businessinsider.com/best-cloud-storage-price-google-drive-dropbox-icloud-one-drive-2014-12 (Year: 2014).*

(Continued)

*Primary Examiner* — Christopher D Birkhimer
(74) *Attorney, Agent, or Firm* — Staniford Tomita LLP (57) ABSTRACT

Embodiments are directed to a cost-aware object selection for cloud garbage collection that deletes completely dead objects and also selects low-live objects up to a carefully selected liveness threshold value. This threshold is dynamically chosen per cloud garbage collection cycle by balancing costs including egress, input/output operations (IOPs), storage cost of cleaning partial live objects, and the storage cost incurred by leaving behind dead data by not cleaning the object. The threshold value is dynamically calculated to accommodate different cost models for different cloud providers and also caters to different costs for different storage tiers.

7 Claims, 7 Drawing Sheets

(56) References Cited

U.S. PATENT DOCUMENTS

| | | | | |
|---|---|---|---|---|
| 9,336,133 | B2* | 5/2016 | Sinclair | G06F 12/0246 |
| 9,348,746 | B2* | 5/2016 | Sinclair | G06F 12/0246 |
| 9,465,731 | B2* | 10/2016 | Sinclair | G06F 3/0688 |
| 9,715,434 | B1* | 7/2017 | Xu | G06F 3/067 |
| 9,734,050 | B2* | 8/2017 | Sinclair | G06F 12/0253 |
| 9,734,911 | B2* | 8/2017 | Sinclair | G06F 3/0658 |
| 9,778,855 | B2* | 10/2017 | Sinclair | G06F 3/064 |
| 10,108,543 | B1* | 10/2018 | Duggal | G06F 11/1453 |
| 10,108,544 | B1* | 10/2018 | Duggal | G06F 11/14 |
| 10,120,613 | B2* | 11/2018 | Sinclair | G06F 12/02 |
| 10,133,490 | B2* | 11/2018 | Sinclair | G06F 3/0655 |
| 10,380,098 | B1* | 8/2019 | Marelas | G06F 11/1453 |
| 10,430,279 | B1* | 10/2019 | Dittia | G06F 3/0656 |
| 10,649,682 | B1* | 5/2020 | Chinthekindi | G06F 3/0643 |
| 10,795,812 | B1* | 10/2020 | Duggal | G06F 3/067 |
| 10,983,715 | B2* | 4/2021 | Sharoni | G06Q 20/322 |
| 2007/0033325 | A1* | 2/2007 | Sinclair | G06F 3/0608 711/170 |
| 2008/0082596 | A1* | 4/2008 | Gorobets | G06F 12/0253 |
| 2008/0144079 | A1* | 6/2008 | Pandey | H03M 7/30 358/1.15 |
| 2008/0189477 | A1* | 8/2008 | Asano | G06F 12/0246 711/E12.008 |
| 2008/0229003 | A1* | 9/2008 | Mizushima | G06F 12/0804 711/E12.008 |
| 2010/0077013 | A1* | 3/2010 | Clements | G06F 16/1748 707/822 |
| 2010/0174881 | A1* | 7/2010 | Anglin | G06F 11/1453 711/E12.103 |
| 2010/0281081 | A1* | 11/2010 | Stager | G06F 9/5022 707/814 |
| 2011/0055455 | A1* | 3/2011 | Post | G06F 12/0246 711/E12.001 |
| 2011/0145473 | A1* | 6/2011 | Maheshwari | G06F 12/0873 711/E12.008 |
| 2011/0161784 | A1* | 6/2011 | Selinger | G06F 11/1016 714/E11.002 |
| 2014/0108721 | A1* | 4/2014 | Byun | G06F 3/064 711/112 |
| 2014/0325148 | A1* | 10/2014 | Choi | G06F 3/0659 711/114 |
| 2014/0365719 | A1* | 12/2014 | Kuzmin | G06F 12/0246 711/103 |
| 2015/0227602 | A1* | 8/2015 | Ram | G06F 11/1456 707/634 |
| 2015/0347295 | A1* | 12/2015 | Ihm | G06F 12/0253 711/103 |
| 2016/0246713 | A1* | 8/2016 | Choi | G06F 3/0608 |
| 2017/0123655 | A1* | 5/2017 | Sinclair | G06F 3/061 |
| 2018/0314727 | A1* | 11/2018 | Epstein | G06N 5/003 |
| 2018/0373446 | A1* | 12/2018 | Mulholland | G06F 3/064 |
| 2020/0089420 | A1* | 3/2020 | Sharoni | G06F 3/0637 |
| 2020/0133719 | A1* | 4/2020 | Chinthekindi | G06F 3/0644 |
| 2020/0133720 | A1* | 4/2020 | Chinthekindi | G06F 9/4875 |
| 2020/0250083 | A1* | 8/2020 | Shilane | G06F 3/0652 |
| 2020/0285611 | A1* | 9/2020 | George | G06F 16/289 |
| 2020/0310686 | A1* | 10/2020 | Truong | G06F 3/067 |
| 2020/0310964 | A1* | 10/2020 | Lu | G06F 3/0608 |
| 2020/0310965 | A1* | 10/2020 | Brandt | G06F 3/0608 |

OTHER PUBLICATIONS

Anonymous, "Amazon EBS Pricing", Dec. 31, 2020, pp. 1-9, https://web.archive.org/web/20201231110542/https://aws.amazon.com/ebs/pricing/ (Year: 2020).*

Aleksandar Kochovski, "Best Cloud Storage for Large Files 2020: Bigger Is Better", Nov. 30, 2020, pp. 1-26, https://web.archive.org/web/20201130175809/https://www.cloudwards.net/best-cloud-storage-for-large-files/ (Year: 2020).*

Anonymous, "Disks and images pricing", Feb. 4, 2021, pp. 1-10, https://web.archive.org/web/20210204203942/https://cloud.google.com/compute/disks-image-pricing (Year: 2021).*

Anonymous, "Quotas & Limits", Dec. 20, 2018, pp. 1-3, https://web.archive.org/web/20181220114347/https://cloud.google.com/storage/quotas (Year: 2018).*

* cited by examiner

| Algorithm | Free only dead objects | Cost-Aware, Dynamic threshold based selection | | | | Copy Forward All |
|---|---|---|---|---|---|---|
| Total Data | 200TB | 200TB | | | | 200TB |
| Total objects | 200 million | 200 million | | | | 200 million |
| Initial Storage Cost | $2100 | $2100 | | | | $2100 |
| After GC Cycle TCO | | | | | | |
| Objects with Liveness % selected | 0% | [0-10%] | [0-20%] | [0-30%] | [0-40%] | [0-50%] |
| Storage Capacity Freed(TB) | 5 TB | 15TB | 25.24 TB | 46 TB | 64 TB | 87.0 TB |
| Live Data Copy forwarded(GB) | 0 GB | 1200 GB | 4600 GB | 12100 GB | 24100 GB | 46600 GB |
| GC Cycle Egress Cost ($) | $0 | $84.00 | $322.00 | $847 | $1687 | $3262.00 |
| GC Cycle IOPs Cost | $0 | $6.48 | $24.84 | $65.34 | $130.14 | $251.64 |
| Storage Cost after GC($) | $ 1995.00 | $1768.2 | $1482.60 | $1115.10 | $737.1 | $264.6 |
| TCO(After GC cycle) | $ 1995.00 | $1858.68 | $1829.44 | $2027.44 | $2554.24 | $3778.24 |

COST-AWARE GARBAGE COLLECTION FOR CLOUD STORAGE

TECHNICAL FIELD

This invention relates generally to deduplication storage systems, and more particularly to implementing cost-effective garbage collection for cloud storage.

BACKGROUND OF THE INVENTION

Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. In a deduplication file system, such as the DellEMC Data Domain File System (DDFS), data is segmented into segments (or chunks) and hash fingerprints are calculated for these data segments. These fingerprints are then looked up in the in-memory fingerprint cache or on-disk fingerprint index table for deduplication. Only those segments which cannot be deduplicated are grouped together in a region and a bunch of such regions are grouped and written to a block or container on disk and index is updated with the fingerprints corresponding to these new chunks being written.

DDFS and other similar systems have added cloud-tier capability allowing applications to move data from on-premise active-tier storage to cloud-based storage. As files are deleted or expired, dead data must be cleaned up in the cloud-tier. Since DDFS is a deduplicated storage, data/segments in the objects are shared by different files. So when data dies, there is a possibility that the entire object does not become dead because some shared data segments being referenced by other files keep the object alive. To reclaim dead space from the system, garbage collection (GC) processes are used to free up space for other data. The garbage collection process reads an old block, copies the live data from it to a new block, and deletes the old block.

There are currently two known cloud GC methods to free up dead space in the cloud. The first method is to clean completely dead objects by issuing deletes. Objects that are partially dead are read, and the live portion of the data are copied forward into a new object, and the old objects are deleted. This way the dead space is freed up from partial live cloud objects as well. However, reading and writing objects from cloud storage to on-premises incurs egress cost and IOPS (I/O per second) cost. This method is thus not often deployed in the field due to high egress costs contributing to a high total cost of ownership (TCO) to users.

The second approach, which is currently well-deployed in the field, is a cloud GC algorithm that only deletes the completely dead objects. In this approach the read/write IOPs cost and the egress is completely avoided. The only ownership cost to the customer is the storage cost. However, with this method, the cloud GC algorithm cleaning efficiency is reduced as objects with low liveness are not cleaned and the dead space from these partial dead objects is not reclaimed and left behind. This dead space due to uncleaned partial dead objects causes cloud storage costs to accumulate over time. This increases the storage usage in the cloud, thus ultimately increasing the TCO for the user.

What is needed, therefore, is a cloud-based garbage collection method that minimizes user TCO yet maintains high garbage cleaning efficiency.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing and storage in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
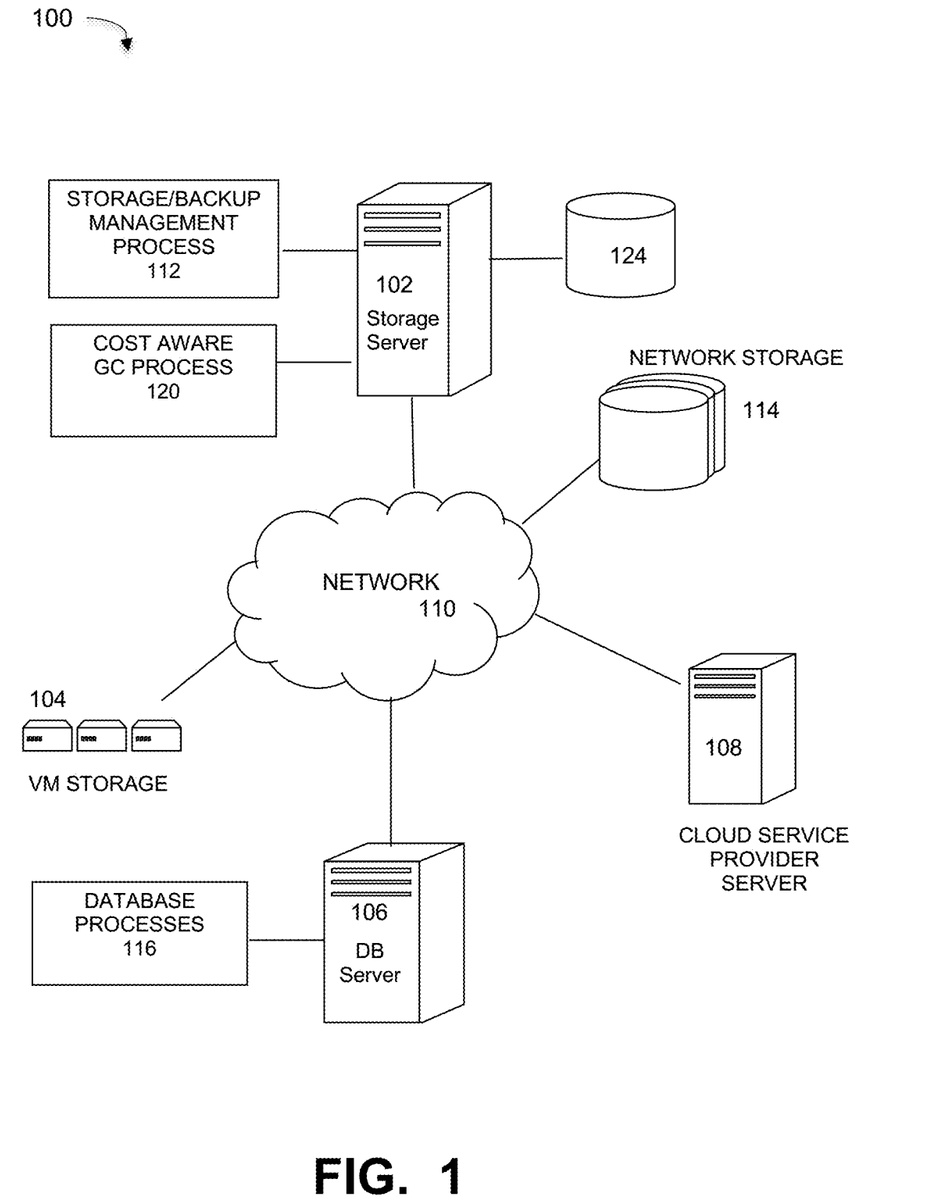
FIG. 1 is a diagram of a deduplication backup network implementing a cost aware garbage collection process, under some embodiments.

Embodiments are described for a method to provide garbage collection assisted deduplication in a log structured file system. FIG. 1 illustrates a computer network system that implements one or more embodiments of a deduplication backup system implementing a cost aware GC process 120, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 may be a database server executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP) 108. The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays.

In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible. In general, Data Domain is a purpose-built backup appliance providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays. Data Domain has a logical extension to its file system and MTree organization which allows a data movement policy to be applied to aging backup content.

The Data Domain File System (DDFS) is an inline data deduplication file system. As data gets written to the file system, DDFS breaks it into variable sized segments and a group of segments are packed in a compression region. A number of compression regions are grouped together and written as a container to disk. A compression region is of an average size of 64 kB. For an average 4k segment size for a compressed segment, each compression region contains about 16 segments. DDFS calculates fingerprint signatures for each segment using an SHA1 algorithm. DDFS has an on-disk fingerprint index table, which maps the fingerprint to the container-ID, that has the corresponding segment data. Each container has a metadata section followed by a bunch of data sections. The data sections store the compression regions, and a container metadata section stores the meta information of the container. That is, it stores the total number of compression regions, the total number of segments, the fingerprint of each segment, the encryption, and the compression information of the compression regions as well.

In a deduplicated file-system that forms segments from data, these segments are uniquely identified by their key/label called a fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is thus represented by a Merkle tree, with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. We refer to segments above L0 as Lp chunks. The L6 segment of every file is stored in a namespace which is represented as a B+ Tree. The L0 and Lp segments are written to separate containers, known as L0 and Lp containers.

Figure 2:
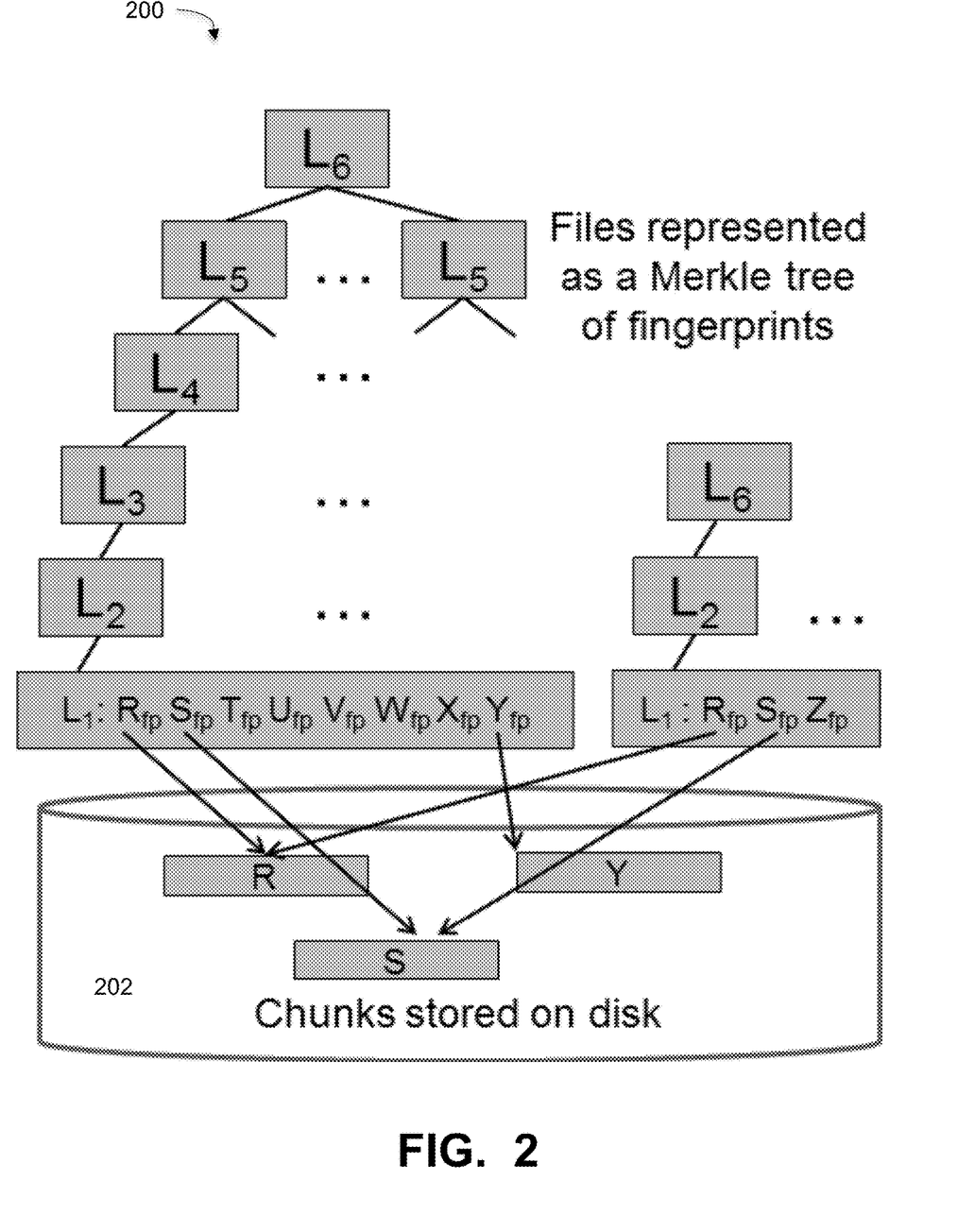
FIG. 2 illustrates an example Merkle tree representation of files in a deduplication backup system, under some embodiments.

FIG. 2 illustrates an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is labeled $L_6$ for convenience, even if the file is small enough not to need intermediate nodes such as the example on the right side of the figure. The $L_1$-$L_6$ chunks are referred to as Lp chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, Lp chunks are themselves stored on disk in containers, which include a relatively small (hundreds of KB) metadata section with a list of fingerprints for the chunks within the container. Thus, they may be read more quickly than the full container.

With reference to FIG. 2, the L0 segments represent user data and are the leaves of the tree. The L6 is the root of the segment tree. As stated above, segments from L1 to L6 are the metadata segments or LP segments and represent the metadata of a file associated with a file tree. An L1 segment is an array of L0 references. Similarly an L2 is an array of L1 references and so on. A segment is considered live if it can be referenced by any live content in the file system. The file system packs the segments into containers that are written to disk in a log-structured manner. Each container is structured into sections. The first section is the metadata section and the following sections are referred to as compression regions. In the metadata section there are all the references or fingerprints that identify the segments in the container. A container manager may be used that is responsible to maintain the log-structured container set and provide a mapping from container identifiers (CID) to block offset on disk. This mapping is entirely stored in memory. The garbage collection process of the file system is responsible for enumerating all live segments in the live content handles of the file system. In a physical garbage collection process, the enumeration algorithm carries out a breadth-first traversal of all the files in the file system.

Deduplication backup systems, such as the DellEMC Data Domain system use deduplication techniques as a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

To service an input/output (I/O) operation initiated from an external backup application, the Data Domain File System (DDFS) must initiate multiple internal I/O operations, such as to lookup LP segment fingerprints, look up indexes, read container metadata, and to read the actual data before servicing the I/O to the backup application. In addition to the external backup application workload there could be some internal file system maintenance operations, such as garbage collection, and so on, that are concurrently executed to keep the system at an optimal state. The I/O's that are initiated as part of backup application workload as well as the internal maintenance operations would be serviced from the same storage devices.

In an embodiment, system 100 implements a log structured file system in which data and metadata are written sequentially to a log that is implemented as a circular buffer. Log-structured file systems must reclaim free space from the tail of the circular buffer log to prevent the file system from becoming full when the head of the log wraps around to meet to the tail of the log. The tail can release space and move forward by skipping over data for which newer versions exist farther ahead in the log. If there are no newer ersions, then the data is moved and appended to the head. This is performed by a garbage collector (GC) or garbage collection function, which may execute certain GC policies to remove file segments or blocks that are marked for deletion. Such policies can specify a periodic cleaning schedule during which the garbage collector runs a cleaning operation. The cleaning operation may include enumerating the files in the file system of the backup system to identify files for blocks marked for deletion. Since a garbage collection can consume a significant amount of resources, the garbage collection policies allow the user to specify the conditions (e.g., times) when garbage collection may be run. The GC process usually runs as a separate background job to scan all data segments in the file system to find out unreferenced data segments and remove them to release disk space. It also re-packs data into new objects in order to make data objects in similar size, since keeping all objects in as similar a size as possible generally helps performance, and prevents growing metadata due to storing very small objects.

In an embodiment, the storage unit that runs DDFS and stores data is the active-tier. On active tier the L0 and LP containers are 4.5 MB. The average number of compression regions in a data container are 4.5 MB/64k~=72 compression regions. With an average of 16 segments per compression region, the container contains approximately 1000 segments (16*72).

Data domain has added cloud-tier capability allowing applications to move data from on-premise active-tier to cloud. As stated above, current cloud GC methods, such as issuing deletes or deleting only completely dead objects generally increase TCO for users to impractical levels. In an embodiment, the storage server 102, or other computer within system 100, such as a cloud 110 process, executes a cost aware GC process 120 that provides intelligent object selection for cleaning, where, in addition to deleting the completely dead objects, it also select low-live objects up to a carefully selected liveness threshold value. This threshold is dynamically chosen per cloud GC cycle balancing following the costs: (1) egress+IOPs+storage cost of cleaning partial live objects, and (2) storage costs incurred by leaving behind dead data by not cleaning the object. This process utilizes a dynamic threshold to cater to different cost models for different Cloud providers, and also caters to different costs for different storage tiers (e.g., disk or tape versus solid state, and so on).

The cloud-tier capability of Data Domain moves data from on-premise active-tier storage to cloud storage, and also provides a single namespace that spans both active and cloud tiers. When a file is moved from active to cloud-tier, the location information of the file referring to cloud object storage is stored in the namespace. For the cloud-tier, a container, known as CMETA container is used to store the metadata sections of multiple L0 and Lp containers. Data Domain adopts a meta-separated architecture to store the metadata in the local storage and the actual data in the cloud object store. The metadata is stored locally to avoid cloud reads during ingest for deduplication and during garbage collection for enumeration. The local metadata consists of Lp containers and CMETA containers. The L0 containers are stored directly in the cloud.

It should be noted that for purposes of description, the term 'container' and 'object' are used interchangeably, though a container usually refers to a collection of data segments (compression segments) stored in disk storage (such as for DDFS), while an object refers to a collection of data segments stored in the cloud.

Figure 3:
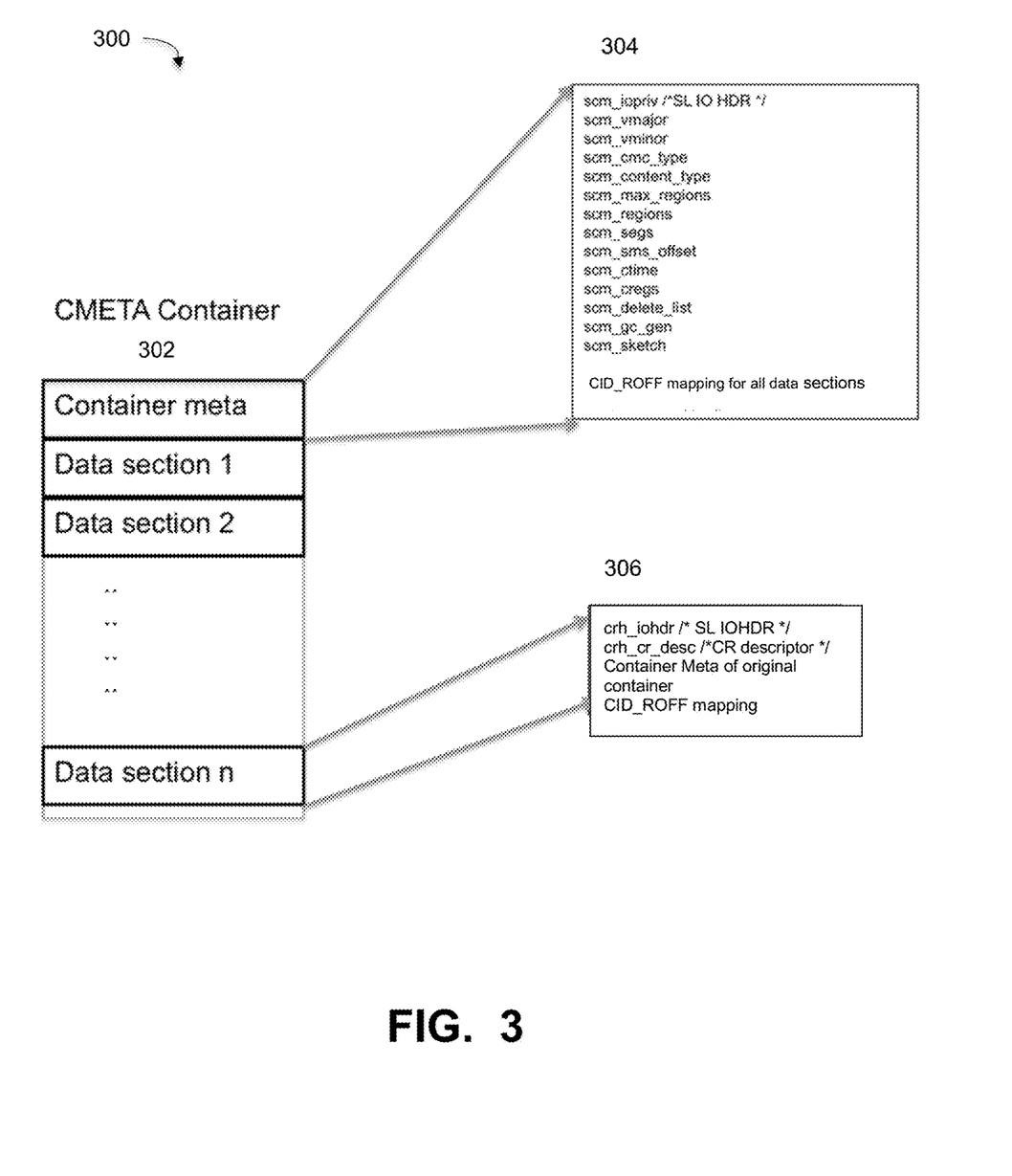
FIG. 3 illustrates the on-disk format of a metadata (CMETA) container under some embodiments.

FIG. 3 illustrates the on-disk format of a CMETA container under some embodiments. As shown in FIG. 3, diagram 300 includes a CMETA container 302 containing the Container meta followed by N data sections denoted Data section 1 to Data section n. Data element 304 illustrates an example composition of the Container meta, while data element 306 illustrates an example composition of a data section.

A first version of the cloud-tier solution stores each compression region of an L0 container as an individual object in the cloud. The compression region size or the object size is approximately 64k. A second version of cloud-tier solution stores the entire L0 container as a single object in the cloud, thus substantially reducing the total number of objects in the cloud, by increasing the object size. For public cloud implementations, each object in the cloud is 1 MB, and 1 MB contains about 16 compression regions (1 MB/64k).

Since DDFS is a deduplication file system, the same data segments are shared by different files. To clean dead data belonging to deleted/expired files, a cloud GC process runs a mark and sweep algorithm, where the system enumerates live references (a segment is a live segment if it is referenced by another live segment). A L6 segment is live if there is a corresponding file in the namespace) and mark them as live in a perfect hash vector (PHVEC). So for each data container the system issues lookups to the PHVEC to estimate the percentage of the live data in each container. Based on the % of live data in the container and the way the system copies forward the live data, and delete;

As described earlier, there are currently two cloud GC methods. The first is that GC copies forwards cloud storage data objects from on-premise DD system. Here DD system reads data objects from cloud storage to on-premise, prepares new destination data objects and writes them back to cloud storage over the network. As discussed above, this solution incurs huge egress cost, and so this solution is not enabled by default in the field. The other method is that GC deletes only the fully dead objects and does not copy forward any partially live/dead objects, to prevent egress cost of cloud providers. This solution does not incur any egress costs. However, GC cannot clean objects having the mixture of live and dead objects. This leads to object fragmentation, causing inefficient cleaning. This is the solution currently deployed in the field, though it is inefficient. As can be appreciated, both current methods increase the TCO for customers by increasing egress cost or increasing overall cloud storage.

Embodiments of the cost aware GC process 120 for cloud storage maintain a balance between keeping the TCO for users to an optimal value by factoring in the following costs: (1) egress+IOPs+storage cost of cleaning partial live objects, and (2) storage cost incurred by leaving behind dead data by not cleaning the object.

Figure 4:
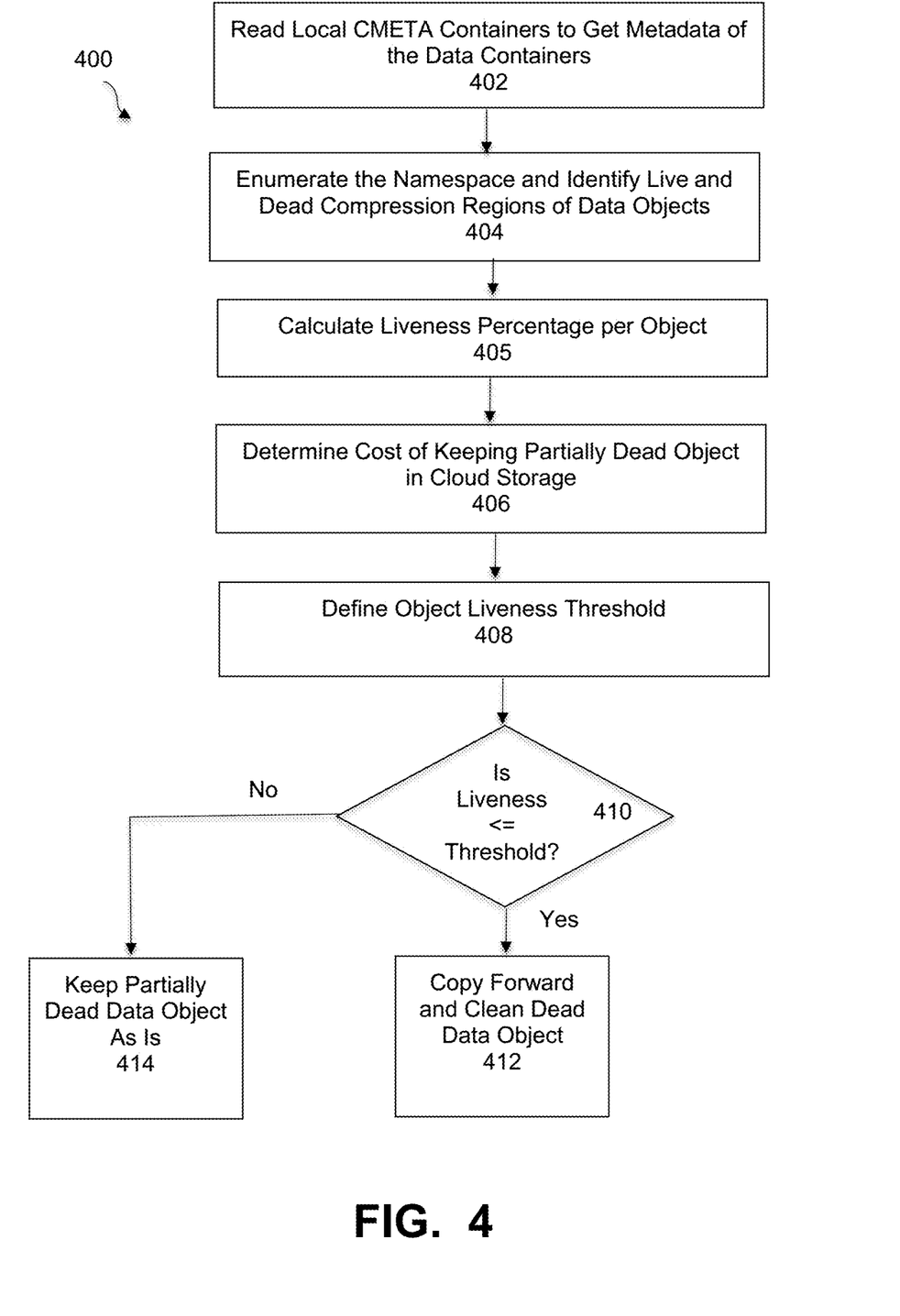
FIG. 4 is a flowchart that illustrates a cost aware garbage collection process for cloud storage, under some embodiments.

FIG. 4 is a flowchart that illustrates a cost aware garbage collection process for cloud storage, under some embodiments. As shown in FIG. 4, process 400 begins by reading the local CMETA (metadata) containers, 402. For Data Domain, the metadata is for user backup data and is stored locally in the DD system. The process iterates each data section (e.g., 306) in a CMETA container 302 to get metadata 304 of the actual data containers. The metadata contains fingerprints of all segments of actual containers and its compression regions. The <L0 Data container id, compression_region_offset, compression_region_size> can be translated to the object.

The cloud GC process enumerates the name space and identifies the live and dead compression regions of the data objects, 404. The liveness percentage per object is calculated as number of (live compression regions/total compression regions), 405. The liveness percentage of a region is generally determined by calculating the number of live data segments in the region compared to a defined liveness threshold, which may be set as a percentage of live segments relative to all segments of a region, such as 10%, 20%, or any other appropriate level.

Figure 5:
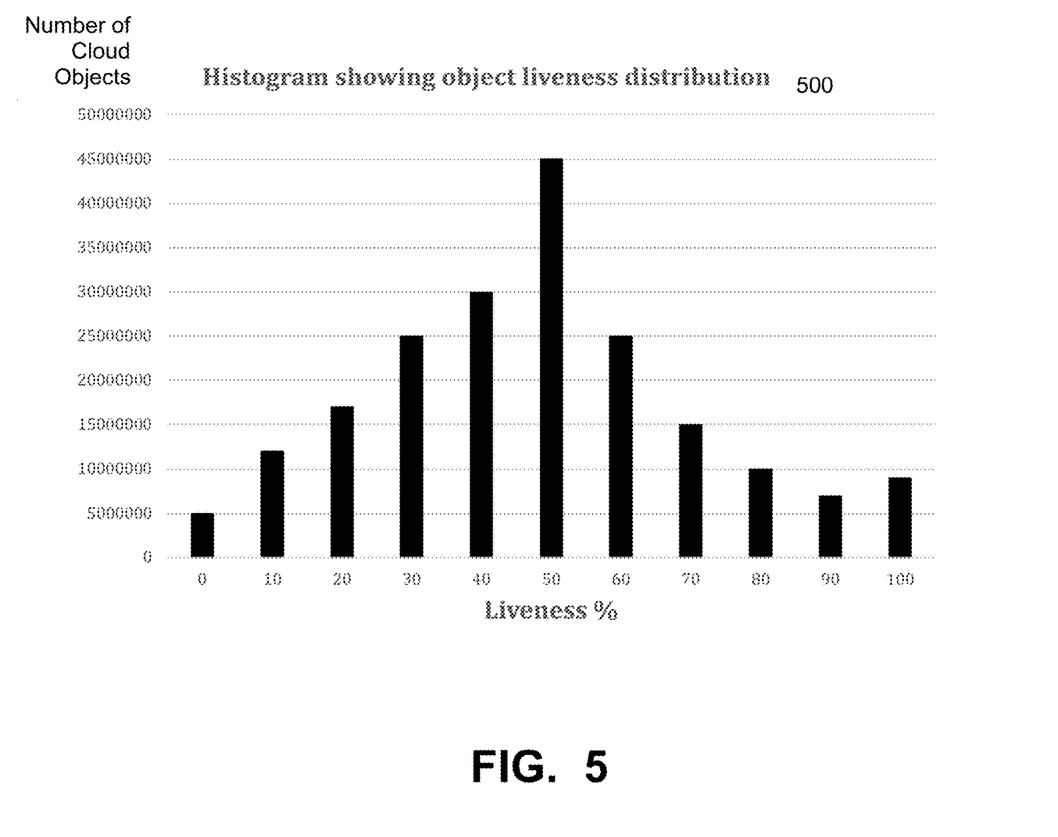
FIG. 5 is a histogram illustrating a liveness distribution across objects for a study conducted for a number of data objects in a single example GC cycle.

As explained above, an object has a number of compression regions, where a compression region comprises a number of compressed data segments. A compression region is either live or dead. If an object has 100 compression regions, of which 50 are live, then the object is 50% live, while an object with 10 live regions is 10% live. FIG. 5 is a histogram 500 illustrating a liveness distribution across objects for a study conducted for a number of data objects in a single example GC cycle. The graph of FIG. 5 illustrates a number of cloud objects ranging from 5 million to 500 million with different liveness percentages. As can be seen in FIG. 5, the number of containers that are completely live or completely dead are lower than those that are partially live, such as those that are 50% live, and that the number of containers with a liveness range of 10-50% are comparatively high.

As described above, there is a cost associated with keeping a partially dead object in the cloud storage, as well as an egress plus IOPS cost associated with cleaning the partially dead object (read/write the live portion of the object to/from on-premise to cloud storage). To optimize the TCO cost for the customer, process 400 dynamically chooses the optimum object liveness threshold percentage, where this optimum depends on the cost metrics of the cloud provider and storage class type. The TCO cost is generally the sum of costs associated with data storage plus IOPs cost plus egress cost. In an embodiment, the TCO cost is calculated using the following formula:

TCO=Storage Cost+PUT cost+GET cost+Egress Cost

The TCO cost given above is one example of a TCO cost and other or different cost components are also possible. For example, most cloud providers do not presently impose a write cost, but if applicable, a write cost may also be factored into the TCO, along with any other relevant cost items.

The threshold is dynamically adjusted for every GC cycle, thus making the selection process cost-aware. Thus, in step 406, process 400 determines the cost of keeping a partially dead object in cloud storage, and defines an object liveness threshold value, 408. The GC cycle may vary depending on system configuration and scheduling constraints. For example, GC processes are typically performed on the order of once a month or just a few times a year since GC operations are time consuming and cost intensive.

Based on the selected threshold value, the process determines, in decision block 410, to copy forward and clean dead data, 412, if the object liveness percentage is less than or equal to (<=) the threshold percentage value. Conversely, it keeps the partially dead object as it is, 414, if the object liveness percentage is greater than the threshold percentage value. Process 400 thus copies forwards all the data objects satisfying this cost-aware threshold value, and cleans the dead data. Thus, for example, if the threshold value is 40% liveness and an object has a liveness percentage of 30%, it has more dead segments than specified by the threshold, and will be cleaned with the live segments being copied forward, as per step 412. Likewise, if an object has a liveness percentage of 50%, for this threshold value, the dead segments will be kept as is, as per step 414.

In general, the charge-back costs comprising the TCO vary depending on the cloud provider and the class of storage. Embodiments account for the cloud provider egress cost and storage costs, and dynamically determine a threshold liveness value, and the clean dead segments up to that threshold. In this way, the process can maintain the TCO to the customer close to the current methods where egress cost is not involved. At the same time, the process frees up more capacity for the user. This thus increases GC efficiency while maintaining at least current cost levels to the user.

In general, different cloud providers use different pricing schedules to provide cloud service to users, and may charge on the basis of different usage parameters, such as storage usage, bandwidth utilization, processing resource utilization, input/output operations (IOPs), and so on. They may also provide different types of storage within the cloud, such disk (HDD) storage, tape storage, solid state disk (SSD) storage, and so on. Some storage, such as SSD is fast, but expensive, while others such as HDD or tape are less expensive, but slower.

Studies were performed to compare the cost-aware and dynamic threshold based object selection process with existing cloud GC algorithms. A fragmentation study using telemetry data analysis of deployed systems was performed to see how much dead space is left behind because of object fragmentation. Such studies generally show that a large number of cloud GC cycles leave behind 80-100% of cleanable dead data, thus indicating that present cloud GC algorithms have low efficiency. In systems where fragmentation is high, further analysis into the liveness % distribution in the objects show that there are high number of objects with very low live data. Egress cost is saved but the customer must still pay for storage costs for dead data for a long period.

Figure 6:
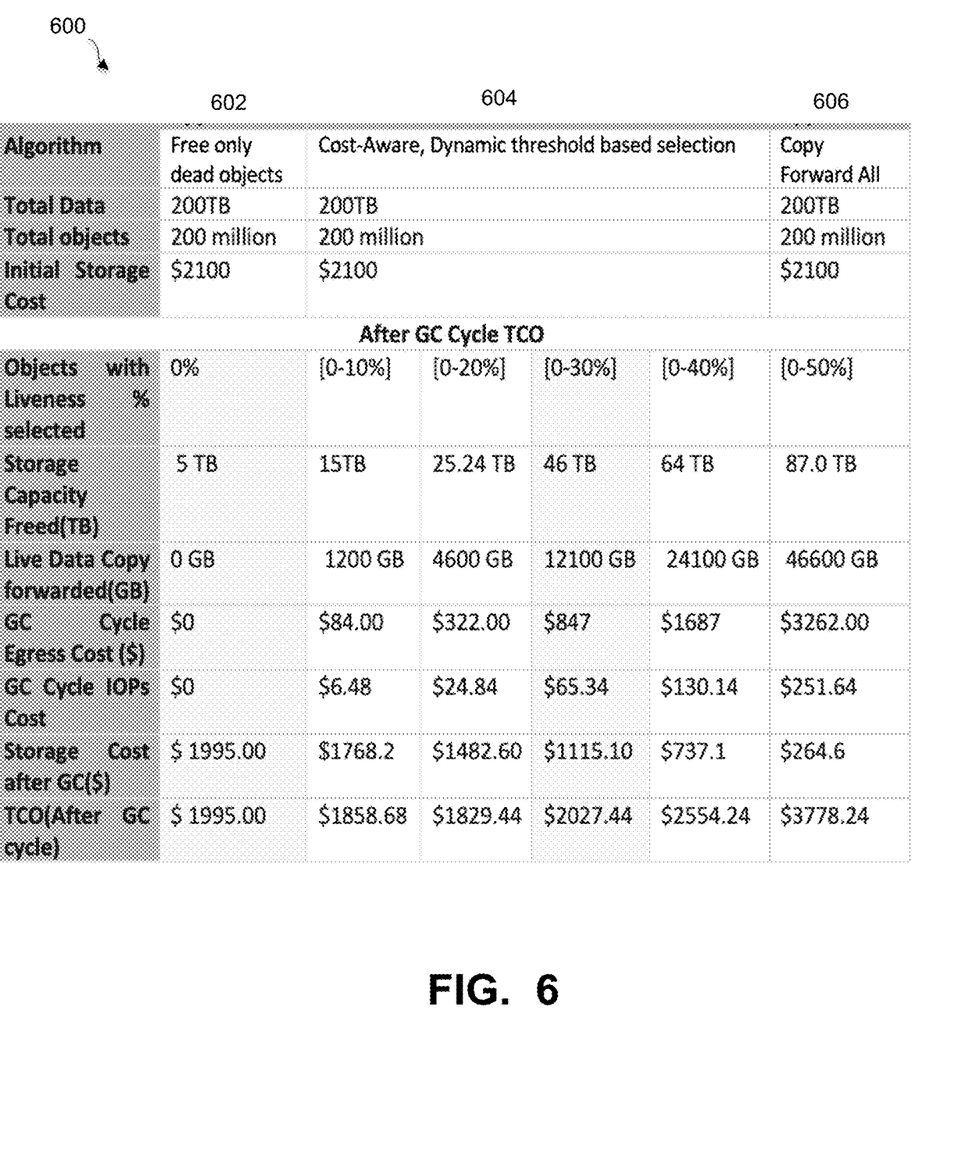
FIG. 6 is a table that illustrates an example cost comparison for present cloud GC processes compared to the cost-aware GC process, under an example embodiment.

FIG. 6 is a table 600 that illustrates an example cost comparison for present cloud GC processes compared to the cost-aware GC process 120, under an example embodiment. For this example, the charge back costs are provided as follows:
1. Storage Cost is 0.021 (Storage/GB/month)
2. PUT: $0.005 per 1000 requests
3. GET: $0.0004 per 1000 requests
4. Egress cost: $0.07 per GB The cost comparison table 600 of FIG. 6 compares the two common existing cloud GC methods of freeing only dead objects 602, where only dead objects are deleted (so no egress cost is incurred), and copying forward all objects below a liveness threshold, 606 (here the liveness threshold is 50%) with the cost aware cloud GC method 604. This cost-aware process uses a dynamic threshold based selection based on the cloud provider costs, as shown in FIG. 4. Table 600 shows the example cost calculations for threshold percentages <50%. The example of FIG. 6 shows a scenario with an initial storage cost of $2100 for each algorithm 602-606. After a GC cycle, the TCO is $1995 for the free only dead objects algorithm 602, and $3778 for the copy forward all algorithm 606. The cost-aware algorithm 504 has several different costs for different liveness percentages. Table 4 shows for detailed cost calculations, hut for a 200 TB cloud storage, 20% liveness threshold to select candidate cleaning objects and 1 MB object size, the TCO to customer is $1829. From the example of FIG. 6, it can be seen that based on the TCO to the user, selecting the threshold of 20% would be the most optimal. The method 604 caters to varying charge-back costs as based on the cloud provider egress cost and storage costs, to dynamically determine a threshold, and clean up to that threshold so as to maintain the TCO close to the current approach 602 where egress cost is not involved.

The process 604 determines the different costs based on different threshold liveness values and selects a threshold value corresponding to an optimal cost. In general, the optimal cost for a user corresponds to the lowest cost among several different possible costs. In other cases, the optimal cost may be a cost within a range or within certain cost criteria, such as costs that represent a tradeoff for performance or other relevant factors. This optimum cost thus represents the optimum TCO value for the GC cycle. The iterative calculation of TCO for the different liveness threshold ranges or values represents a dynamic process that calculates different TCO totals based on different cost factors (e.g., storage, egress, IOPS) for the different liveness percentages and selects the liveness threshold based on the lowest TCO cost.

Embodiments thus include a cost-aware object selection for cloud garbage collection, where in addition to deleting the completely dead objects, also select low-live objects up to a carefully selected liveness threshold value. This threshold is dynamically chosen per cloud GC cycle by balancing costs including egress, IOPs, storage cost of cleaning partial live objects, and the storage cost incurred by leaving behind dead data by not cleaning the object. Since the threshold value is dynamic it can accommodate different cost models for different cloud providers and also caters to different costs for different storage tiers.

System Implementation

With respect to the flowchart of FIG. 4, the functional steps may be performed by hardware processing components provided by one or more of the servers or resources of system 100 of FIG. 1. Such components may be provided or embodied as part of backup process/component 112 and cost-aware cloud GC component 120. Such components may be embodied as one or more (first, second, third, etc.) hardware, processing, or programmed circuits configured to execute program instructions to perform a certain task, interfaces to transmit and receive data within a computer (node) or between computers (nodes), co-processors to perform subroutines or sub-tasks, and other similar components.

Embodiments of the processes and techniques described above can be implemented on any appropriate backup system operating environment or file system, or network server system. Such embodiments may include other or alternative data structures or definitions as needed or appropriate.

Figure 7:
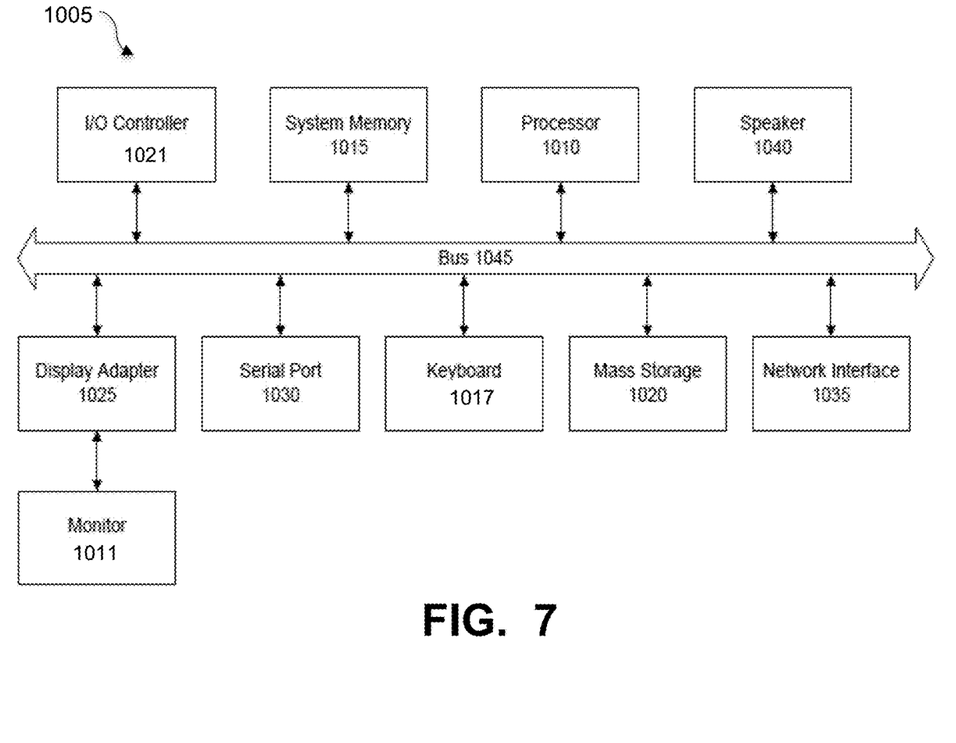
FIG. 7 is a system block diagram of a computer system used to execute one or more software components of cost aware garbage collection process for cloud storage, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 7 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing cost-aware garbage collection (GC) for cloud storage, comprising:

deploying a deduplication backup system storing data in an on-premises active tier for movement to cloud storage and that performs garbage collection (GC) to remove data marked for deletion through at least one of a first GC process that issues deletes to marked data after movement from the cloud storage to the active tier, and a second GC process that deletes only dead data from the cloud storage;

reading locally stored metadata containers to obtain metadata for data objects of the stored data, the data objects each containing a plurality of compression regions, some of which may be dead or live, resulting in data objects that are partially live by containing both dead and live compression regions;

identifying the dead and live compression regions of the data objects;

calculating a liveness percentage per data object as a ratio of live compression regions in the object to all compression regions in the object;

determining a cost of ownership portion for each data object processed by the first GC process based on an egress cost associated with moving data between the cloud storage and the active tier including input/output operations (I/O) cost;

determining another cost of ownership portion for each data object processed by the second GC process based on a storage cost of data fragmentation associated with storing both live and dead data in the cloud storage, the cost of ownership portion and the another cost of ownership portion together comprising a total cost of ownership (TCO);

dynamically selecting a liveness value as a threshold based on cost metrics of a cloud provider and a storage type, and wherein the threshold is dynamically adjusted for every GC cycle to determine a minimum TCO associated with keeping the partially dead object in the cloud storage for a corresponding GC cycle relative to the egress cost;

keeping a dead object if its liveness percentage is greater than the threshold to be not deleted by a next GC cycle and prevent any associated I/O cost; and cleaning the dead object in the next GC cycle if its liveness percentage is less than or equal to the threshold, to thereby minimize the TCO and maintain high GC efficiency.

2. The method of claim 1 wherein the cloud provider uses a pricing schedule among different pricing schedules used by cloud providers with pricing based on different usage parameters comprising at least one of: storage usage, bandwidth utilization, processing resource utilization, input/output operations (IOPs).

3. The method of claim 2 wherein the TCO is dictated by service terms imposed by the cloud provider and comprise charge-back costs of the cloud provider.

4. The method of claim 2 wherein the garbage collection process executes a mark and sweep process to enumerate live segments and mark them as live in a perfect hash vector, wherein a live segment is a data segment that is referenced by another live segment.

5. The method of claim 1 wherein a maximum of the threshold is 50% liveness for a data object.

6. The method of claim 1 wherein the cloud storage is used by the deduplication backup system including a data storage server running a Data Domain file system (DDFS) having cloud-tier capability allowing applications to move data from on-premises active-tiers to a cloud tier.

7. A computer program product, comprising a non-transitory computer-readable medium having a computer-readable program code embodied therein, the computer-readable program code adapted to be executed by one or more processors to implement a cost-aware garbage collection (GC) for cloud storage in a computer network by:

accessing a deduplication backup system storing data in an on-premises active tier for movement to cloud storage and that performs garbage collection (GC) to remove data marked for deletion through at least one of a first GC process that issues deletes to marked data after movement from the cloud storage to the active tier, and a second GC process that deletes only dead data from the cloud storage;

reading locally stored metadata containers to obtain metadata for data objects of the stored data, the data objects each containing a plurality of compression regions, some of which may be dead or live, resulting in data objects that are partially live by containing both dead and live compression regions;

identifying the dead and live compression regions of the data objects;

calculating a liveness percentage per data object as a ratio of live compression regions in the object to all compression regions in the object;

determining a cost of ownership portion for each data object processed by the first GC process based on an egress cost associated with moving data between the cloud storage and the active tier including input/output operations (I/O) cost;

determining another cost of ownership portion for each data object processed by the second GC process based on a storage cost of data fragmentation associated with storing both live and dead data in the cloud storage, the cost of ownership portion and the another cost of ownership portion together comprising a total cost of ownership (TCO);

dynamically selecting a liveness value as a threshold based on cost metrics of a cloud provider and a storage type, and wherein the threshold is dynamically adjusted for every GC cycle to determine a minimum TCO associated with keeping the partially dead object in the cloud storage for a corresponding GC cycle relative to the egress cost;

keeping a dead object if its liveness percentage is greater than the threshold to be not deleted by a next GC cycle and prevent any associated I/O cost; and cleaning the dead object in the next GC cycle if its liveness percentage is less than or equal to the threshold, to thereby minimize the TCO and maintain high GC efficiency.

* * * * *